(12) United States Patent
Euler-Rolle

(10) Patent No.: US 12,449,200 B2
(45) Date of Patent: Oct. 21, 2025

(54) COOLER WITH FAN HOUSING COMPRISING RECESS FOR CONTROL UNIT

(71) Applicant: Thomas Euler-Rolle, Vienna (AT)

(72) Inventor: Thomas Euler-Rolle, Vienna (AT)

(*) Notice: Subject to any disclaimer, the term of this patent is extended or adjusted under 35 U.S.C. 154(b) by 249 days.

(21) Appl. No.: 18/245,698

(22) PCT Filed: Oct. 15, 2021

(86) PCT No.: PCT/AT2021/060375
§ 371 (c)(1),
(2) Date: Mar. 16, 2023

(87) PCT Pub. No.: WO2022/077043
PCT Pub. Date: Apr. 21, 2022

(65) Prior Publication Data
US 2023/0358476 A1    Nov. 9, 2023

(30) Foreign Application Priority Data
Oct. 16, 2020 (AT) .............................. A 50891/2020

(51) Int. Cl.
*F28D 1/00* (2006.01)
*F04D 25/06* (2006.01)
(Continued)

(52) U.S. Cl.
CPC .............. *F28D 1/024* (2013.01); *F04D 25/06* (2013.01); *F04D 29/522* (2013.01); *F28F 27/00* (2013.01); *F28D 2021/0049* (2013.01)

(58) Field of Classification Search
CPC .......... F28D 1/024; F28F 27/00; B60K 11/08; B60K 11/085; F01P 5/06; F01P 5/14; F01P 7/048; F01P 7/12; F24F 1/02
See application file for complete search history.

(56) References Cited

U.S. PATENT DOCUMENTS 5,566,745 A * 10/1996 Hill ........................... F01P 7/04
165/41
5,660,149 A * 8/1997 Lakerdas .................. F01P 5/06
123/41.01
(Continued)

FOREIGN PATENT DOCUMENTS

CN    210440250 U    5/2020
DE    3903199 C1    4/1990
(Continued)

OTHER PUBLICATIONS

ISA European Patent Office, International Search Report Issued in Application No. PCT/AT2021/060375, Jan. 24, 2022, WIPO, 6 pages.

*Primary Examiner* — Travis Ruby
(74) *Attorney, Agent, or Firm* — McCoy Russell LLP

(57) ABSTRACT

Described is a cooler having: a heat exchanger for dissipating heat from a medium, for example oil, a fan having a fan housing, a fan wheel and a motor, a control unit for controlling the motor, a sensor unit for detecting an operating parameter of the heat exchanger and/or of the fan, the sensor unit being connected to the control unit in order to set an operating state of the cooler, the fan housing having a recess in which the control unit is arranged together with the sensor unit.

14 Claims, 2 Drawing Sheets

(51) Int. Cl.
  *F04D 29/52* (2006.01)
  *F28D 1/02* (2006.01)
  *F28F 27/00* (2006.01)
  *F28D 21/00* (2006.01)

(56) References Cited

U.S. PATENT DOCUMENTS

| | | | |
|---|---|---|---|
| 6,532,909 | B2 | 3/2003 | Stauder et al. |
| 6,600,249 | B2 * | 7/2003 | Nelson ................ F04D 25/0633 310/58 |
| 9,604,534 | B1 * | 3/2017 | Zhou .................... B60K 11/085 |
| 2010/0271797 | A1 * | 10/2010 | Schurz .................... F01P 7/048 318/471 |
| 2015/0369257 | A1 * | 12/2015 | Fujii .................... F04D 25/068 415/177 |
| 2016/0115856 | A1 | 4/2016 | Ge et al. |
| 2016/0208810 | A1 * | 7/2016 | Tse .......................... F04D 25/06 |
| 2018/0372051 | A1 * | 12/2018 | Mizui .................. F02M 69/042 |
| 2019/0277543 | A1 * | 9/2019 | D'Souza ................ F24F 13/30 |
| 2020/0309016 | A1 * | 10/2020 | Jeong .................... B60K 11/085 |

FOREIGN PATENT DOCUMENTS

| | | |
|---|---|---|
| DE | 4300577 A1 | 7/1993 |
| DE | 20122784 U1 | 9/2007 |
| DE | 102010048451 A1 | 4/2012 |
| DE | 102012018571 B3 | 10/2013 |
| DE | 102017111982 A1 | 12/2017 |
| EP | 3889436 A1 | 10/2021 |
| WO | 0184063 A2 | 11/2001 |
| WO | 2005075831 A1 | 8/2005 |
| WO | 2019166190 A1 | 9/2019 |

* cited by examiner

COOLER WITH FAN HOUSING COMPRISING RECESS FOR CONTROL UNIT

CROSS REFERENCE TO RELATED APPLICATIONS

The present application is a U.S. National Phase of International Application No. PCT/AT2021/060375 entitled "COOLER," and filed on Oct. 15, 2021. International Application No. PCT/AT2021/060375 claims priority to Austrian Patent Application No. A 50891/2020 filed on Oct. 16, 2020. The entire contents of each of the above-listed applications are hereby incorporated by reference for all purposes.

TECHNICAL FIELD

The invention relates to a cooler, comprising:
a heat exchanger for dissipating heat from a medium, for example oil,
a fan having a fan housing, a fan wheel and a motor,
a control unit for controlling the motor,
a sensor unit for detecting an operating parameter of the heat exchanger and/or of the fan, the sensor unit being connected to the control unit in order to set an operating state of the cooler.
The invention further relates to a fan for such a cooler.

BACKGROUND AND SUMMARY

DE 10 2017 111 982 A1 shows a fan used in a cooling system of a vehicle. A fan housing comprises a recessed region. A motor drive device having a printed circuit board is arranged in this recessed region. There is further provided an electronic control unit (ECU) that detects information about the operating condition of each part of the motor by means of various sensors, including a temperature sensor, a pressure sensor, a rotation sensor, a flow sensor, a position sensor, and the like. The ECU is arranged outside the fan with the motor drive device. An input terminal of the motor drive device is connected to the ECU via a dedicated line.

DE 4300577 A1 shows a device for closing a cooling air passage of the cooler of a motor vehicle. The device comprises a fan with an electric motor. A heat sensor is attached to the front of a cooling air passage. An adjusting ring controlling the movements of cooling air flaps is actuated by the heat sensor with the interposition of a lever drive. A control unit for controlling the electric motor is not disclosed. The adjusting ring can open and close the cooling air flaps. However, there is no indication that the adjusting ring or the heat sensor would be able to control the electric motor.

CN 210 440 250 U shows a fan of a different type.

DE 3903199 C1 shows a different type of cooler-fan arrangement for engine cooling.

Cooling devices are used in the prior art for a wide variety of applications, for example as engine coolers. A cooling system has become known from DE 10 2012 018 571 B3. The cooling system comprises a fan for generating a cooling air flow and a heat exchanger for cooling a medium, for example cooling water, by means of the cooling air flow.

Moreover, oil-air coolers are known in the prior art, in which the temperature of the medium is detected. Depending on the temperature of the medium, the rotational speed of the fan can be adjusted. In this prior art, a temperature sensor is screwed to the heat exchanger. From the temperature sensor, a data cable runs to a controller which is connected to the motor via another data cable. However, a disadvantage of this design is the high constructional expenditure. Furthermore, the assembly is complex. In addition, the screwing in of the temperature sensor can cause leaks. Moreover, it would be desirable if the desired operating point of the cooler could be maintained with higher efficiency by more intelligent control of the motor.

A different type of fan unit is known from WO 2005/075831, in which electrolytic capacitors for a brushless electric motor are arranged outside a housing for the motor in a spoke of a cover sheet. This is intended to reduce the dimensions of the housing for the motor.

In contrast, the object of the present invention is to provide a cooler and a fan as a component of the cooler which alleviates or eliminates at least individual disadvantages of the prior art. The invention preferably aims at providing a cooler and a fan with which the operating state can be maintained with the least possible constructional effort and with high efficiency.

This object is achieved by a cooler and a fan as disclosed herein.

According to the invention, the fan housing comprises a recess in which the control unit is arranged together with the sensor unit.

Advantageously, therefore, the sensor unit and the control unit are integrated in the fan housing. According to the invention, the control unit and the sensor unit are arranged in the same recess of the fan housing, i.e. in the immediate spatial vicinity of each other. This is accompanied by a substantial structural simplification of the cooler. Preferably, the sensor unit can be directly connected to the control unit, with no data cable between the sensor unit and the control unit. Furthermore, the wall of the fan housing can be used to replace some or all of the housing parts of the sensor unit and of the control unit. Advantageously, the sensor unit is protected in the recess. Furthermore, the assembly of the cooler can be simplified. In a preferred embodiment, the fan and the heat exchanger are connected to each other via screw connections. In this embodiment, the sensor unit can be arranged in the recess of the fan housing without its own connection to the heat exchanger, in particular without a screw connection, so that the sensor unit is ready for use when the fan is connected to the heat exchanger.

According to a preferred embodiment, the recess is delimited by a rear wall and/or a bottom wall and/or a ceiling wall and/or side walls of a compartment of the fan housing. Thus, the compartment of the fan housing can be used to enclose the control unit and the sensor unit. Advantageously, the rear, bottom and ceiling walls as well as the side walls of the compartment can replace at least individual housing parts, in particular the complete housing, of the control unit and/or of the sensor unit. As a result, a part-saving, cost-effective design is achieved.

In order to integrate the recess for the control and sensor units into the fan housing with little effort, it is beneficial if the rear wall and/or the bottom wall and/or the ceiling wall and/or the side walls of the compartment are formed integrally with a shell enclosing the fan blades and/or with a fan hub enclosing the motor and/or with a front covering the fan blades (and preferably having ventilation openings) and/or with an outer housing of the fan housing, the outer housing comprising a rectangular outer contour. Particularly simple and inexpensive is a design in which a single part, for example made of metal or plastic, forms not only the shell, the front and the outer housing of the fan housing, but also the rear, bottom, and ceiling walls as well as the side walls of the compartment for the control unit and sensor unit.

In a preferred embodiment, the recess is located in an outer edge region, in particular in an outer corner region, of the fan housing. This embodiment is particularly beneficial if a substantially rectangular outer housing and a cylindrical shell are provided for enclosing the fan wheel, so that four outer corner regions are formed on the fan housing. In this design, the recess for the control unit and sensor unit can be formed in one of the four outer corner regions. Furthermore, interfering influences of the motor, in particular magnetic influences, on the control unit or sensor unit can be reduced if the control unit and sensor unit is arranged in the corner region of the fan housing.

If the control unit comprises a printed circuit board on which the sensor unit is arranged, it is in particular possible to eliminate a data cable between the sensor unit and the control unit.

In order to facilitate the detection of the operating parameter, in particular of the heat exchanger, it is beneficial if the recess for the control unit and the temperature sensor is open towards the heat exchanger. Thus, the sensor unit can face the heat exchanger, whereby the operating parameter of the heat exchanger can be detected precisely and with little effort. Preferably, the control unit and the sensor unit are attached to the fan housing only. As a result, the assembly is made substantially easier.

In a preferred embodiment, a control line from the control unit in the recess to the motor in a fan hub comprises a first portion along a cylindrical shell of the fan housing, and/or a second portion in the axial direction of the fan housing and/or a third portion in the radial direction of the fan housing. As a result, the amount of wiring required can be kept low.

For displaying sensor information of the sensor unit, a display can be provided on the fan housing, in particular on the side of the rear wall of the recess facing away from the control unit.

In a particularly preferred embodiment, the sensor unit comprises a temperature sensor for detecting the temperature of the medium, for example water or oil. Depending on the detected temperature of the medium, a control signal can be transmitted to the motor for the fan wheel. The control signal can in particular effect that the motor is switched on or off or that the rotational speed of the fan wheel caused by the motor is changed. As a result, the desired operating state of the cooler can be set, with which, for example, a certain temperature of the medium is specified. Setting the operating state of the cooler can therefore comprise regulating the actual temperature of the medium in the heat exchanger to a target temperature by controlling the motor.

In a preferred embodiment, an infrared sensor can be provided as the temperature sensor. Furthermore, a contact sensor can be provided as a temperature sensor. Depending on the design, the temperature sensor can be configured for direct detection of the temperature of the medium or for indirect detection of the temperature of the medium via the temperature of the wall of a medium channel of the heat exchanger, the medium channel carrying the medium.

In order to integrate the temperature sensor into the fan housing with as few structural changes as possible, it is advantageous if the temperature sensor is connected to a fastening screw (e.g., fastening screw 23 at FIG. 2) between the fan and the heat exchanger. For example, the temperature sensor can be arranged in a recess of the fastening screw.

In order to be able to adjust the operating condition of the cooler even more precisely, it is beneficial if a sensor for detecting the flow velocity of the air along the fan is provided (e.g., sensor 24 at FIG. 5). The sensor for detecting the flow velocity of the air can be accommodated in the same recess as the control unit and sensor unit. Alternatively, the sensor for detecting the flow velocity of the air can be provided elsewhere in the fan housing.

Furthermore, a sensor for detecting an air pressure in the fan housing can be provided (e.g., sensor 25 at FIG. 5). The sensor for detecting the air pressure, in particular an overpressure or negative pressure, can be accommodated in the same recess as the control unit and sensor unit. Alternatively, the sensor for detecting the air pressure can be provided elsewhere in the fan housing.

An axial fan is preferably provided as the fan. An electric motor is preferably provided as the motor. The heat exchanger preferably comprises multiple separate medium channels for the medium and or multiple separate air channels, in particular between the medium channels. The fan is preferably attached to the heat exchanger, in particular via screw connections.

BRIEF DESCRIPTION OF THE FIGURES

The invention is explained below with reference to a preferred exemplary embodiment, which is illustrated in the drawings.

DETAILED DESCRIPTION

Figure 1:
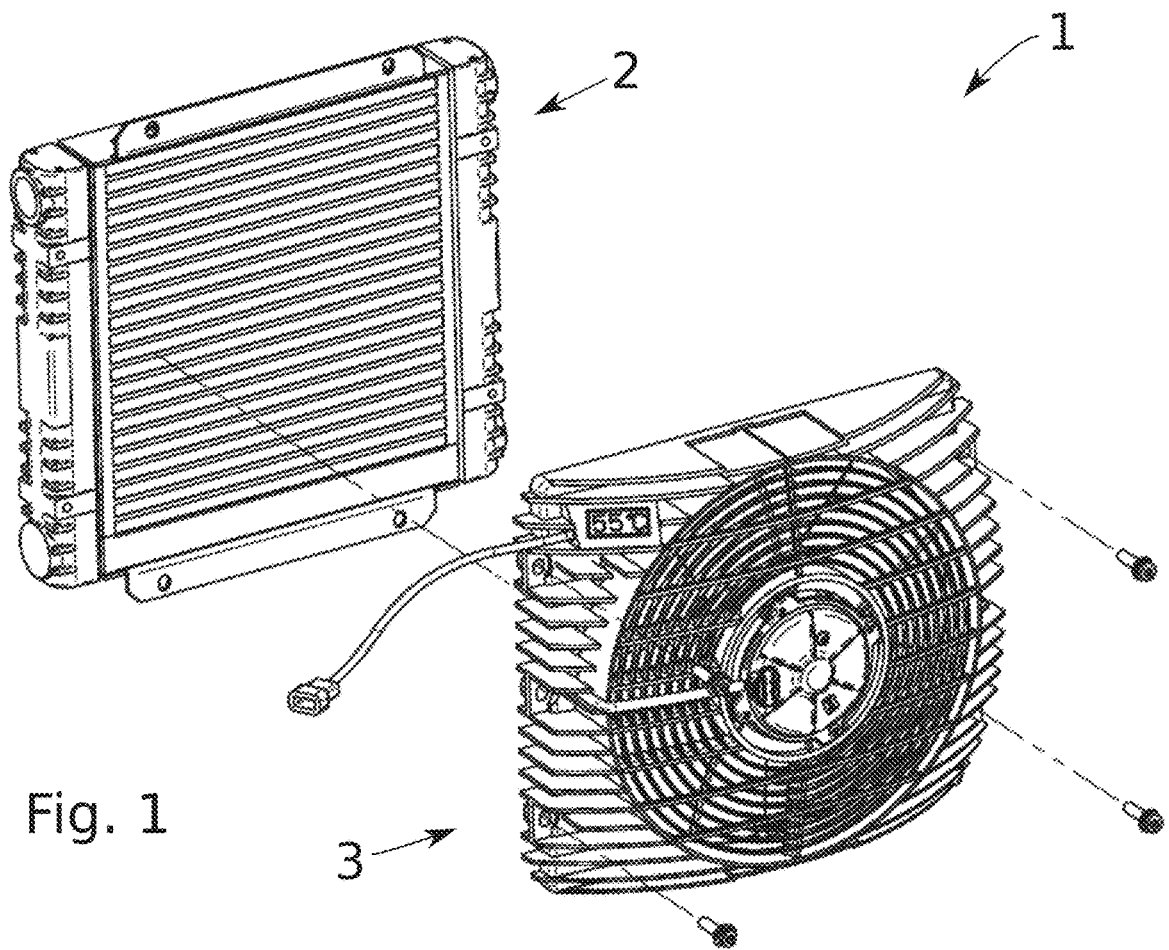
FIG. 1 shows a cooler according to the invention with a heat exchanger and a fan, the fan housing of which has a recess for a control and sensor unit.
Figure 2:
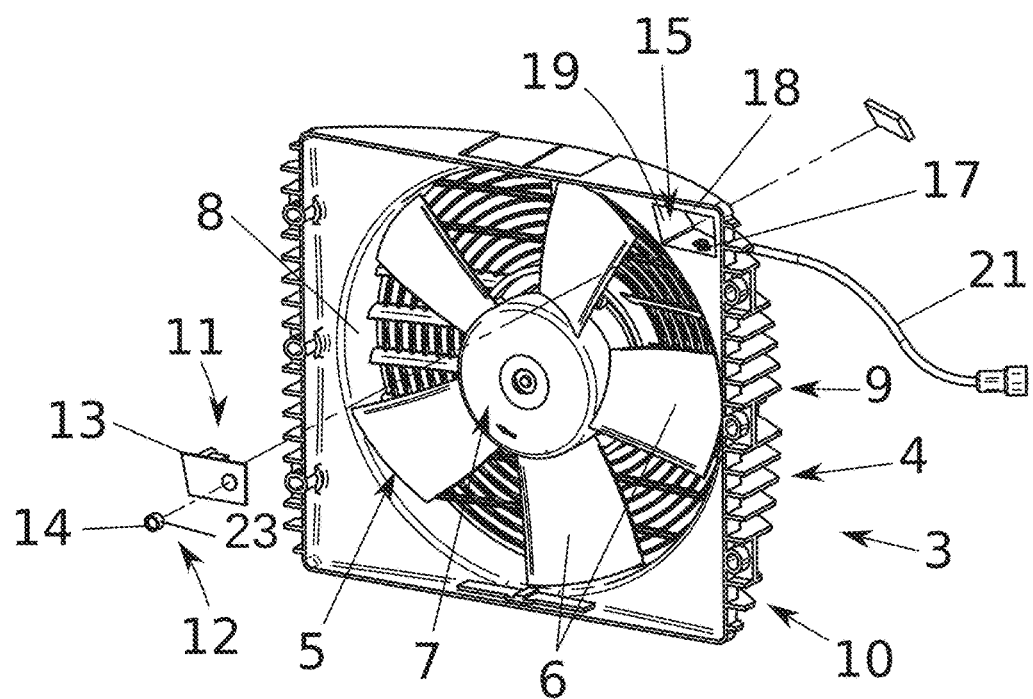
FIG. 2 shows an exploded view of the fan shown in FIG. 1, wherein a temperature sensor for detecting the temperature of the medium in the heat exchanger is arranged on the printed circuit board of the control unit.

FIG. 1 shows a cooler 1 with a heat exchanger 2 which has multiple medium channels and air channels separated therefrom. A medium, for example oil, flows in the medium channels. The cooler 1 also has an (axial) fan 3 which generates an air flow through the air channels of the heat exchanger 2. The medium is cooled by heat exchange with the air. The fan 3, also referred to as a ventilator, has a fan housing 4 and a fan wheel 5 with individual fan blades 6. The fan housing 4 has a fan hub 7 in which a motor for rotating the fan wheel 5 is accommodated. Furthermore, the fan housing 4 has a shell 8 surrounding the fan blades 6, a front 9 for covering the fan blades 6 on the side facing away from the heat exchanger 2, and an outer housing 10 with a rectangular outer contour.

In the embodiment shown, the cooler 1 also has a control unit 11 for controlling the motor. Furthermore, a sensor unit 12 for detecting at least one operating parameter of the heat exchanger 2 and/or of the fan 3 is provided. The sensor unit 12 transmits sensor data to the control unit 11. In the embodiment shown, the control unit 11 has a printed circuit board 13 on which the sensor unit 12 is arranged. The sensor unit 12 has a temperature sensor 14 which is configured to measure the temperature of the medium in one of the medium channels of the heat exchanger 2. Moreover, a second sensor can be provided which is configured to measure the flow velocity of the air along the fan 3 (not shown). Finally, a third sensor can be provided which is arranged to detect an air pressure in the fan housing 4 (not shown). Depending on the sensor data of the sensor unit 12, an operating state of the cooler 1 is set by controlling the motor for the fan wheel 5, in particular by switching the motor on or off or by changing the rotational speed of the fan wheel 5.

Figure 5:
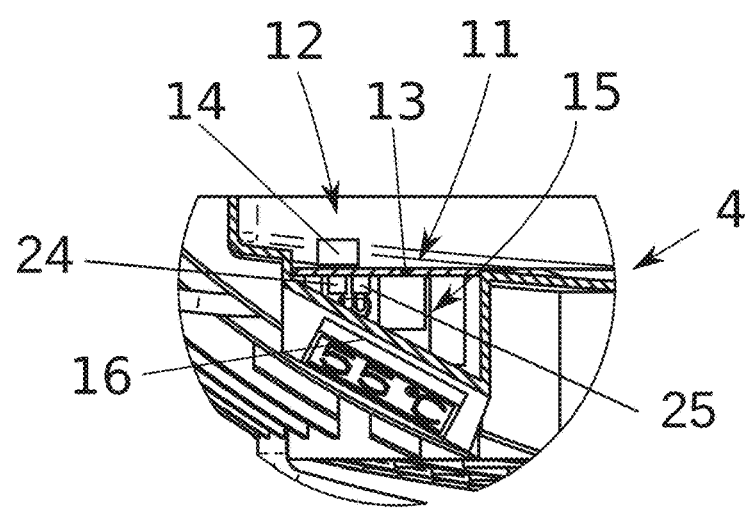
FIG. 5 shows detail A of FIG. 4.

In the embodiment shown, the fan housing 4 has a recess 15 in which the control unit 11 is accommodated together with the sensor unit 12. The recess 15 is delimited by a rear wall 16 (cf. FIG. 5), a bottom wall 17, a ceiling wall 18 and side walls 19 of a compartment of the fan housing 4. The recess 15 for the control unit 11 and the sensor unit 12 is open towards the heat exchanger 2. The rear wall 16, the bottom wall 17, the ceiling wall 18 and the side walls 19 of the compartment of the fan housing 4 are formed integrally, i.e., in one piece, with the shell 8, the fan hub 7, the front 9 and the outer housing 10 of the fan housing 4. The recess 15 is located in an outer corner region of the fan housing 4 between the rectangular outer contour of the outer housing 10 and the cylindrical shell 8 of the fan housing 4.

Figure 3:
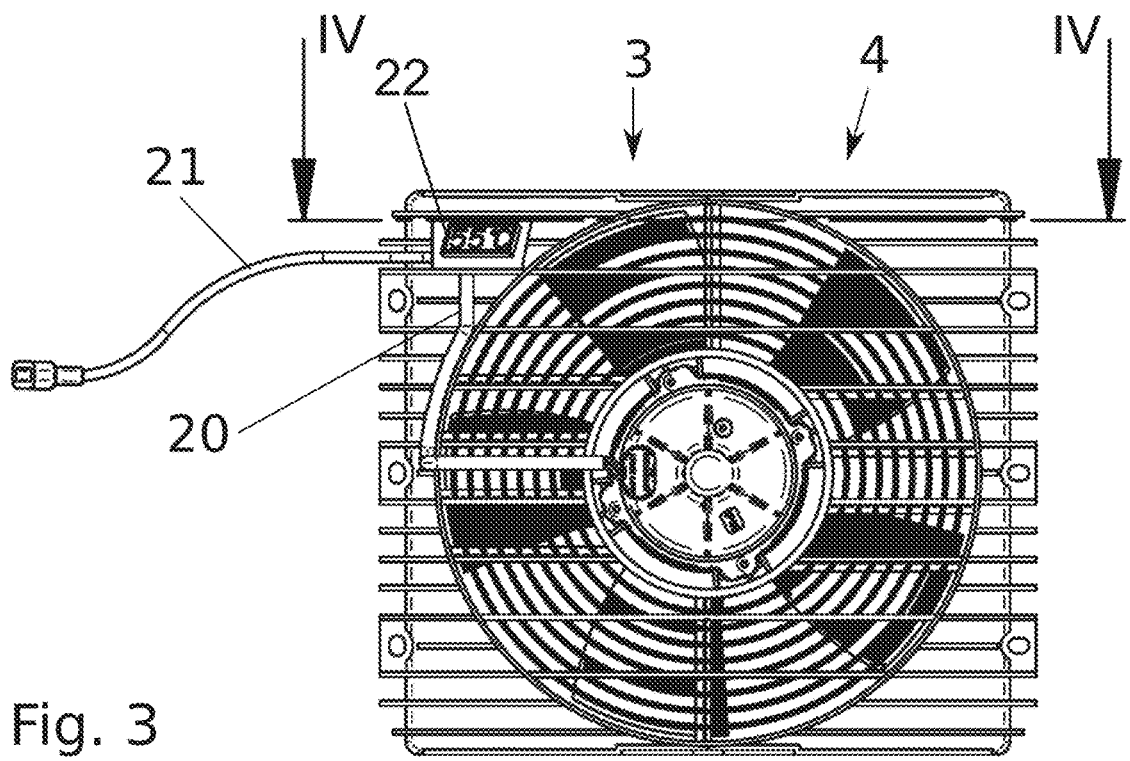
FIG. 3 shows a front view of the fan of FIG. 2.
Figure 4:
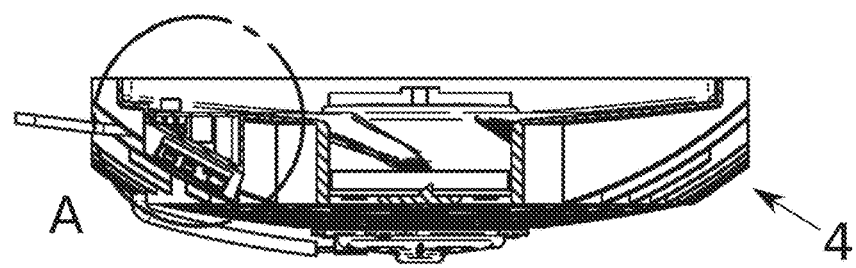
FIG. 4 shows a section along the line IV-IV in FIG. 3.

For controlling the motor, a control line 20 is provided which connects the control unit 11 in the recess 15 to the motor in the fan hub 7 (cf. FIG. 3). The control line 20 has a first portion along the cylindrical shell 8, a second portion in the axial direction of the fan housing 4 and a third portion in the radial direction of the fan housing 4. Furthermore, the control unit 11 and sensor unit 12 is connected to a power supply cable 21.

Moreover, the fan 3 has a display 22 on which sensor information, for example the temperature of the medium detected by the temperature sensor 14 is displayed. In the embodiment shown, the display 22 is provided on the rear side of the recess 15, the rear side facing away from the control unit 11.

The invention claimed is:

1. A cooler, comprising:
a heat exchanger for dissipating heat from a medium,
a fan having a fan housing, a fan wheel and a motor,
a control unit for controlling the motor, the control unit comprising a printed circuit board,
a sensor unit for detecting an operating parameter of the heat exchanger and/or of the fan, the sensor unit comprising at least one sensor and being connected to the control unit in order to set an operating state of the cooler,
wherein
the fan housing comprises a recess in which the control unit is arranged together with the sensor unit, wherein the recess for the control unit and the sensor unit is open towards the heat exchanger.

2. The cooler according to claim 1, wherein the recess is delimited by a rear wall and/or a bottom wall and/or a ceiling wall and/or side walls of a compartment of the fan housing.

3. The cooler according to claim 2, wherein the rear wall and/or the bottom wall and/or the ceiling wall and/or the side walls of the compartment are/is formed integrally with a shell enclosing fan blades and/or with a fan hub enclosing the motor and/or with a front covering the fan blades and/or with an outer housing of the fan housing, the outer housing comprising a rectangular outer contour.

4. The cooler according to claim 1, wherein the recess is located in an outer edge region of the fan housing.

5. The cooler according to claim 4, wherein the recess is located in an outer corner region of the fan housing.

6. The cooler according to claim 1, wherein the sensor unit is arranged on the printed circuit board.

7. The cooler according to claim 1, wherein a control line from the control unit in the recess to the motor in a fan hub comprises a first portion along a cylindrical shell of the fan housing and/or a second portion in the axial direction of the fan housing and/or a third portion in the radial direction of the fan housing.

8. The cooler according to claim 1, wherein a display for displaying sensor information is provided on the fan housing.

9. The cooler according to claim 8, wherein the display for displaying sensor information is provided on the side of the rear wall of the recess facing away from the control unit.

10. The cooler according to claim 1, wherein the sensor unit comprises a temperature sensor for detecting the temperature of the medium.

11. The cooler according to claim 10, wherein the temperature sensor is connected to a fastening screw between the fan and the heat exchanger.

12. The cooler according to claim 1, wherein a sensor for detecting the flow velocity of air along the fan is provided.

13. The cooler according to claim 1, wherein a sensor for detecting an air pressure in the fan housing is provided.

14. The cooler according to claim 1, wherein the medium is oil.

* * * * *